No. 619,688. Patented Feb. 14, 1899.
F. B. LINN.
STOCK PEN.
(Application filed July 6, 1898.)
(No Model.) 2 Sheets—Sheet 2.
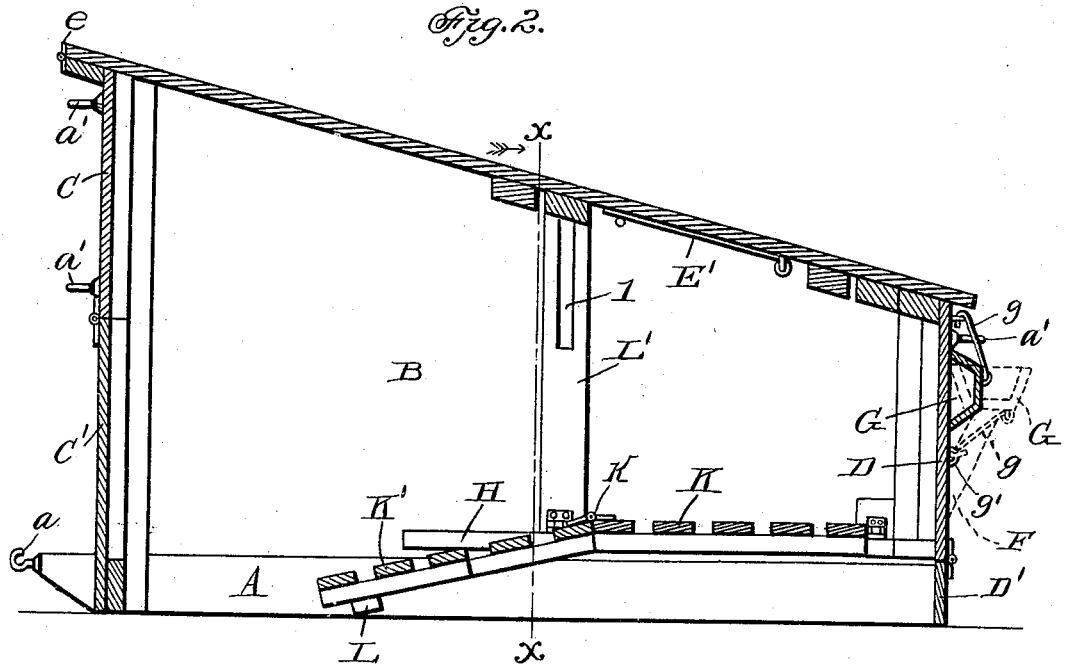
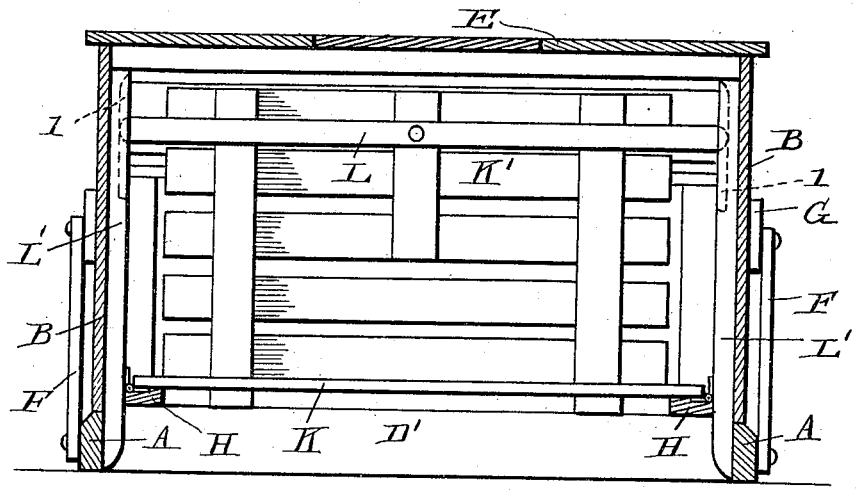
WITNESSES:
Edwin G. McKee
Philip A. Masi
INVENTOR
F. B. Linn
BY E. W. Anderson
ATTORNEY.

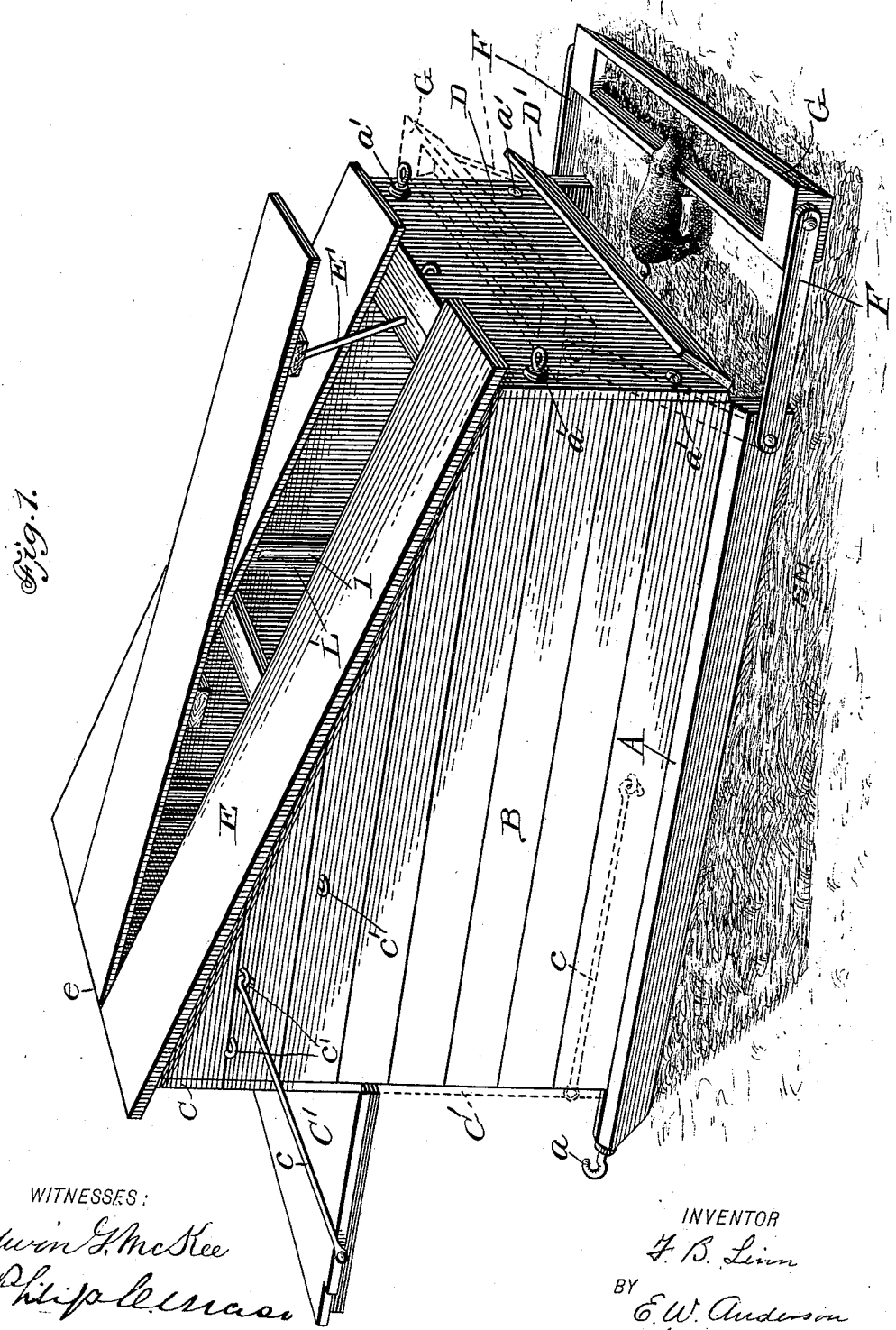

UNITED STATES PATENT OFFICE.

FRANK B. LINN, OF LENEXA, KANSAS.

STOCK-PEN.

SPECIFICATION forming part of Letters Patent No. 619,688, dated February 14, 1899.

Application filed July 6, 1898. Serial No. 685,239. (No model.)

*To all whom it may concern:*

Be it known that I, FRANK B. LINN, a citizen of the United States, and a resident of Lenexa, in the county of Johnson and State of Kansas, have invented certain new and useful Improvements in Hog or Stock Pens; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of the invention in perspective. Fig. 2 is a longitudinal vertical section, and Fig. 3 is a section on the line $x\,x$ of Fig. 2.

This invention is designed to provide a portable stock or hog pen of new and useful character; and it consists in the novel construction and combination of parts, all as hereinafter described, and pointed out in the appended claims.

Referring to the accompanying drawings, the letter A designates the two base-sills of the pen, constructed in the form of runners, whose projecting forward ends are provided with detachable draft-hooks $a$. These runner-sills provide means whereby the pen may be moved from place to place to provide a fresh earth bottom therefor as often as may be desired or for other purposes.

B designates the sides of the pen; C, the front end thereof; D, the rear end, and E the top or roof, the latter being removable. The sides and ends are constructed separately of each other and are secured together at the corners by bolts $a'$ or other detachable fastenings, whereby the parts may be readily taken apart and packed compactly for transportation or for storage when not in use.

The lower portion of the front C forms a vertically-movable door C', hinged or pivotally connected at its upper edge to the upper fixed portion, and which may be held open at different angles by means of pivoted supporting-rods $c$, which have hooked upper ends designed to engage eyes or staples $c'$. The lower portion of the low rear wall D of the pen is also provided with a low hinged or pivoted vertically-movable door D'.

Pivoted to the sides of the pen or to the sills A thereof, near their rear ends, are arms F, which pivotally support between their free ends a feed-trough G. These arms may be swung down until the trough rests upon the ground in rear of the pen or they may be turned upwardly with the trough resting against the rear end, in which position it may be secured by a hook $g$ and eye $g'$ or other suitable means. When in this position, it may be supported in proper position or with its open side against the end of the pen, according to whether or not it is desired to use it in this position.

The detachable top or roof E is constructed in several sections, the central section (preferably) being hinged or pivoted at its upper forward end, as indicated at $e$, so that it may be raised for purposes of ventilation. When so raised, it may be supported at different degrees of elevation by means of a pivoted supporting-rod E'.

Pivoted or hinged to the inner sides of the pen just above the sills A are guard-strips H, which may be folded upwardly when not desired for use. The purpose of these strips is to prevent the sow from crushing the little pigs between her body and the sills or sides of the pen.

K K' designate a removable floor, preferably of slatted form and of less length than the length of the pen, being formed in two sections hingedly connected at $k$, the front section K' being of somewhat less transverse width than the rear section K. This floor when in use is supported upon the strips H above described. The front section K' may be let down to form a bridge or approach to the section K for small animals, or it may be turned upwardly into vertical position to form a partition. To secure it in this position, it is provided with a pivoted cleat L, whose end portions are designed to be turned into engagement with vertical grooves $l$ in the inner faces of vertical strips or cleats L, which are secured to the inner lateral walls of the pen. The sectional hinged construction of the floor also enables it to be handled more conveniently and stored more compactly when not in use.

The door C' at the forward end of the pen when supported in raised position forms a shade or awning and also a storm-protector. The small door D' at the rear end of the pen permits the young pigs to run out and be fed (in the trough G) without inteference by the mother.

The entire construction is of light character and can be readily handled and moved from place to place to provide a clean floor, as before described. By raising the floor-section K' into position to form a partition the animals may be confined in the pen while it is being moved from place to place and without danger of injury to them.

Having thus described my invention, what I claim as new, and desire to secure by Letters Patent, is—

1. In a stock-pen, the combination with a closure having a low door at one end for the passage of young animals only, of a feed-trough outside of the closure, and the bars pivoted at one end portion to the ends of the trough and at the opposite end portion to the lateral walls, whereby said trough may be swung vertically by said bars and may also be reversed on its pivotal connections therewith, substantially as specified.

2. In a stock-pen, the combination with the closure forming the pen, and having a hinged door at the end, of a floor removably supported transversely across the rear portion of said closure, and having a hinged section which may be rested on the ground to form an inclined approach to the stationary section, or which may be turned up into vertical position to form a transverse partition for the closure, substantially as specified.

3. In a stock-pen, the combination with the closure forming the pen, and the hinged horizontally and longitudinally extending guard-strips at the sides thereof, of the removable slatted floor having a stationary section supported transversely across the rear portion of the closure upon the said strips, and the hinged section which may be rested upon the ground to form an inclined approach to said stationary section, and which may also be turned up into vertical position to form a transverse partition, together with means for securing the said hinged section in its raised position, substantially as specified.

4. The herein-described portable stock-pen, having its sides, ends, and roof separately constructed and detachably secured to each other, said roof having a pivoted ventilator-section, a low door at one end of said structure for the passage of young animals only, a higher door at its opposite end, lateral, internal guard-strips and a removable raised floor supported on said guard-strips and having a hinged section adapted to be rested on the ground to form an inclined approach to the stationary section, or to be turned up into vertical position to form a transverse partition at the forward end of said stationary section, substantially as specified.

In testimony whereof I affix my signature in presence of two witnesses.

FRANK B. LINN.

Witnesses:
ROSS ALLEN,
ANNIE CARTER.